3,563,912
CATALYST COMPOSITION AND SULFIDING METHOD
Billy J. Young, Fullerton, Calif., assignor to Union Oil Company of California, Los Angeles, Calif., a corporation of California
No Drawing. Filed Mar. 14, 1968, Ser. No. 712,905
Int. Cl. B01j *11/74*
U.S. Cl. 252—430                                   16 Claims

ABSTRACT OF THE DISCLOSURE

The invention relates to catalyst compositions comprising a finely divided active metallic component coated and/or impregnated with an air-imprevious, substantially inert organic sealant such as petroluem wax, and also including sulfur either chemically combined as sulfide with the metallic component, or suspended or dissolved in said sealant. The resulting catalyst compositions can be safely shipped in commerce, loaded into catalytic reactors, purged with hot hydrogen to vaporize and/or hydrocrack the sealant while simultaneously producing a desirably active sulfided form of the catalyst. The basic objectives are to eliminate time consuming conventional presulfiding techniques in the reactor, and to provide means for safely shipping in commerce normally pyrophoric sulfide-containing catalysts.

BACKGROUND AND SUMMARY OF THE INVENTION

Modern petroleum refining and conversion processes such as hydrofining, hydrocracking, reforming, isomerization and the like are normally carried out with the aid of pelleted catalysts comprising a relatively inert carrier or cracking base, upon which is distended a finely divided hydrogenating metal such as nickel, molybdenum, cobalt, platinum, palladium, silver or the like, or compounds thereof. Most of these catalysts have higher activities and longer lives if they are converted to a sulfided form before being used. However, they are normaly shipped by the catalyst manufacturer to the user in a calcined oxide form, e.g. nickel oxide, because the sulfided forms are pyrophoric. If shipped in this form, they must be immersed in a blanket of inert gas to prevent fires, which is impractical. Even if fires do not occur, sulfided catalysts oxidize when exposed to air, thus lowering their activity.

Conventionally, each refiner using such catalysts must install the facilities necessary to sulfide the catalyst after it has been placed in the reactor. The in situ sulfiding operation is cumbersome and time consuming involving passage through the reactor of a stream of hydrogen to which carefully controlled amounts of hydrogen sulfide or other sulfur compounds are added. A carefully controlled schedule of gradually increasing temperatures must be maintained in order to avoid local overheating resulting from the exothermic reducing and sulfiding reactions taking place. Also, water is generated during the reduction-sulfiding operation, and if excessive partial pressures of water vapor are allowed to develop downstreamwardly from the sulfiding front, irrevesible damage to the catalyst may result. Depending upon the composition of the catalyst and the chemical used for sulfiding, the operation may require two to five days. Keeping the reactor out of productive service for this length of time represents a substantial loss of profits.

From the foregoing, it will be apparent that the sulfiding operation is one which can inherently be performed more easily and at less cost by the catalyst manufacturer than by the refiner. This is basically because the manufacturer can perform the operation on relatively small batches of catalysts, or shallow beds thereof, in which heat dissipation and water concentration can be more readily controlled. Accordingly, one aspect of my invention involves the complete reduction-sulfiding of the catalysts with hydrogen and sulfur compounds by the manufacturer, followed by encapsulating the sulfided catalyst with the sealant. The sealant in this case merely acts to prevent oxidation of the catalyst during shipping and loading of the reactors, and a suitably activated catalyst is produced in the ultimate reactor by simply passing hot hydrogen or other inert gas through the reactor to vaporize and/or hydrocrack the sealant. This operation can normally be completed in less than one day, and requires no special facilities or carefully regulated temperature schedule since little if any water vapor or exothermic heat of reaction are generated.

According to another modification of my invention, the manufacturer need not actually carry out a complete sulfiding operation, but rather he may effect a partial sulfiding in such manner as to provide sufficient "built-in" sulfiding agent in the catalyst composition to permit the refiner to complete the sulfiding operation in a much simpler than normal procedure. This partial sulfiding technique consists in passing the catalyst in its calcined-oxidized form, or in its hydrogen-reduced form, through a bath or spray of the molten sealant containing sulfur or a sulfur compound dissolved or suspended therein. The temperature of this bath or spray may be held between about 100° and 500° F. Depending upon the temperature chosen, and the oxidized or reduced state of the catalyst, at least part of the catalyst sulfiding will occur in this operation. If a reduced catalyst is employed, i.e. one which has been converted largely to the metallic form by reduction of the oxidized form with hydrogen at elevated temperatures, the sulfiding may be substantially complete, and little if any water will be generated. If the oxidized form of the catalyst is used, the sulfiding will normally be relatively incomplete unless some hydrogen, or hydrogen yielding compound is also present.

If the sulfiding is not complete a sufficient predetermined amount of sulfur is allowed to remain in the sealant to complete the sulfiding after the catalyst is placed in the reactor. Minimal amounts of water may be generated during completion of the sulfiding by the refiner, but the deleterious effects thereof are minimized by the protective effect of the unvaporized sealant remaining on the catalyst in the downstream part of the reactor. Hence, in this case also, a completely activated and sulfided catalyst can normally be achieved in less than one day with only minimal process control being required. Normally, in this mode of operation, it is preferable to maintain a recirculating stream of hydrogen in order that the excess hydrogen sulfide generated by the catalyzed reaction of sulfiding agent with the hydrogen will be utilized to sulfide catalyst in the upper portion of the reactor, which might otherwise be incompletely sulfided due to stripping of the sulfiding agent from the catalyst before complete reaction thereof with the metallic component can occur.

The invention is of particular value in connection with the sulfiding and activation of a train of two or more catalyst beds in series, wherein an upstream bed must be sulfided but is relatively insensitive to water vapor, while a downstream bed comprises a catalyst which is substantially more sensitive to water vapor. A prime example of such a series operation is found in an "integral" hydrofining-hydrocracking process wherein a mineral oil feedstock is to be first hydrofined and the total hydrofined effluent is passed through a water-sensitive hydrocracking catalyst such as a crystalline zeolite containing a noble metal hydrogenating metal. In the past, the activation of such series trains has been a troublesome problem. According to my invention the problem is conveniently solved by simply employing a prereduced and presulfided hydrofining catalyst protected by a sealant which generates substantially no water vapor during the sealant removal and activation procedure. If any water vapor is generated, as when the hydrofining catalyst is only partially presulfided and remains partially in the oxide state, the hydrocracking catalyst can be protected from its effect by encapsulating it also in the molten sealant during manufacture.

DETAILED DESCRIPTION

Catalyst compositions.—In broad aspect, the principles of this invention may be applied to substantially any finely divided sulfidable metal catalyst, either in powdered form or in pelleted or granular form. Its primary utility however is found in connection with pelleted catalysts consisting of a major proportion of an adsorbent, difficulty reducible, mineral oxide supporting material (which may also exhibit a desired catalytic activity, e.g. cracking activity), and a minor proportion of a sulfidable catalytic metal selected from the class consisting of the Group I–B, II–B, V–B, VI–B, VII–B, and VIII metals, deposited by impregnation and/or ion exchange upon the support. Suitable hydrogenating metals comprise the Group VIB and/or Group VIII metals, or mixtures thereof. Metals of primary concern are molybdenum, tungsten, iron, cobalt, nickel, palladium, platinum and rhodium, although other metals such as chromium, manganese, vanadium, zinc, copper and silver may also be utilized.

Suitable supporting materials include activated alumina, silica gel, titania, zirconia, activated clays, crystalline alumina-silicate zeolites, and mixtures thereof. Typical hydrofining catalysts comprise activated alumina, with or without a minor proportion of coprecipitated silica gel, upon which is deposited about 1–10 weight-percent of cobalt and/or nickel, and about 5–20 weight-percent of molybdenum and/or tungsten. Typical hydrocracking catalysts comprise an acidic cracking base such as coprecipitated silica-alumina, silica-zirconia, crystalline alumino-silicate zeolites such as the X, Y, or L molecular sieves wherein the zeolitic cations are predominantly hydrogen ions and/or polyvalent metal ions, and supported thereon a minor proportion of a hydrogenating metal such as nickel, palladium, platinum and the like. All of these catalysts are normally prepared in the form of pellets of about $\frac{1}{16}$-inch to $\frac{3}{8}$-inch in diameter, or as elongated extrudates of $\frac{1}{32}$–$\frac{1}{4}$-inch diameter.

In the case of powdered catalysts for use in fluidized or slurry type processes, the principles of this invention may also be applied by simply forming the powdered catalyst into blocks or briquettes, with the molten sealant acting as a temporary bonding agent. The powdered catalyst is regenerated for use by simply melting, vaporizing, or hydrocracking the sealant, thus freeing the powdered catalyst. In some cases, a suitable solvent may also be used to remove the sealant.

Presulfiding.—Presulfiding is normally carried out after the catalyst has been calcined in air at e.g. 800–1200° F., and is thus in an oxide form. The sulfiding agent is preferably a mixture of hydrogen and hydrogen sulfide, or a decomposable sulfur compound such as mercaptans or thiophene. Preferably the catalyst is sulfided in shallow layers or small batches by passing the sulfiding gases continuously through the beds in such manner as to sweep out water generated by conversion of the metal oxides to sulfides. Suitable sulfiding temperatures may range between about 200° and 1000° F., the higher temperatures normally being required at least during the terminal portion of the sulfiding in order to complete the removal of water. Following the sulfiding operation, the catalyst should at all times be prevented from contacting air, as by blanketing with an inert gas, until it is coated or impregnated with the sealant.

As an alternative to the foregoing, the oxidized catalyst may first be reduced in hydrogen until substantially all water is expelled at temperatures up to about 1000° F. or more, and then sulfided with elemental sulfur, hydrogen sulfide or any hydro-decomposable sulfur compound.

Sealants.—Operative sealants for use herein may comprise any relatively inert organic coating material capable of forming a solid, substantially gas-impermeable film, having a melting point between about 100° and 400° F., and which is capable of being vaporized and/or hydrocracked off the catalyst at temperatures in the range of about 300° to 800° F. without generating catalyst-damaging decomposition products. Preferred materials comprise high molecular weight paraffinic hydrocarbons such as paraffin waxes, low-melting polyethylene and/or polypropylene (having a melting point in the range of about 200°–300° F.), mixtures thereof and the like. In the case of catalysts which are relatively insensitive to water vapor, oxygenated compounds and ester type waxes of vegetable or animal origin may also be utilized, either alone or in admixture with hydrocarbon waxes and/or polymers. In general, it is desirable to avoid the use of unsaturated and/or aromatic compounds inasmuch as they are prone to form coke upon thermal decomposition. Halogenated polymers and oxygenated polymers are generally to be avoided because upon hydro-decomposition they produce halogen acids and water.

Deposition of sealant.—Any conventional impregnation and/or spraying technique may be employed to deposit the sealant on the catalyst. It is contemplated that the sealant may be uniformly impregnated into the catalyst pellets, or seelctively deposited upon the outer surface thereof. A selective deposition on the outer surfaces may be obtained for example by dropping the catalyst pellets as in a prilling tower, through a mist of the molten, atomized sealant, or by conveying the pellets through a mist chamber on a conveyor belt. These methods can also be used for deeper impregnation by simply controlling contact time. Ordinarily when deeper impregnation is desired, the simplest method involves simply immersing the pellets in a molten bath of the sealant. Suitable temperatures for coating and/or impregnating the pellets may range between about 100° and 500° F., preferably between about 200° and 400° F.

Depth of penetration of the sealant may also be controlled by chilling the pellets to a suitable temperature such that on being passed through a molten bath or mist of sealant, sufficient solidification if obtained immediately in the outer layers of the catalyst to prevent further penetration, contact time in the bath or mist also being limited so as to avoid heating the interior of the pellets.

Removal of sealant.—After the catalyst has been loaded into the reactor, the sealant is preferably removed by circulating hot hydrogen through the reactor at progressively increasing temperatures between about 200° and 800° F. Preferably, elevated pressures of e.g. 200 to 2000 p.s.i.g. are utilized in order to maximize the heat input rate and thus minimize the time required. Depending upon the nature of the sealant and the catalyst, the time required may vary between about 2 and 24 hours, longer times seldom being required.

In cases where the catalyst has been completely sulfided prior to being placed in the reactor, inert gases such as nitrogen and the like may be used instead of hydrogen for stripping the sealant. In some cases it may be desirable to remove at least some of the sealant by solvent extraction with a volatile solvent, followed by gas stripping to remove the remaining solvent and sealant.

In cases where the catalyst has been incompletely sulfided during or before the deposition of sealant, and sulfur or a sulfur compound has been included in the sealant to complete the sulfiding, it is ordinarily necessary to use hydrogen as the stripping medium. The hydrogen combines catalytically with the sulfur or sulfur compound to form hydrogen sulfide, at least to some extent. It is not essential however that the sulfur be converted to hydrogen sulfide in order to obtain effective sulfiding. At elevated temperatures the elemental sulfur is vaporized and can combine directly with the metallic component after it is reduced to the metallic state by the hydrogen.

The following examples are cited to illustrate certain specific applications of the invention, but are not to be construed as limiting in scope:

Example I

A hydrofining catalyst is prepared by impregnating ⅛-inch pellets of activated alumina containing 5 weight-percent of coprecipitated silica gel, with aqueous solutions of nickel nitrate and ammonium molybdate to deposit thereon about 3 weight-percent of nickel and 15 weight-percent of molybdenum. The impregnated pellets are drained, dried and calcined in air at 800° F. The resulting calcined catalyst is then sulfided with a stream of hydrogen gas containing 5 volume-percent $H_2S$ at atmospheric pressure and temperatures gradually increasing from about 300° up to 900° F. over a period of 8 hours. The resulting sulfided catalyst is then cooled to about 250° F. and dipped briefly into a molten bath of petroleum paraffin wax having a melting point of about 110° F., the bath temperature being held at about 300° F. The resulting coated and impregnated pellets are then cooled to room temperature and packed into conventional shipping drums.

To remove the wax from the catalyst pellets, they are loaded into a conventional reactor which is first flushed with nitrogen to remove all air, then pressured up to about 1000 p.s.i.g. with hydrogen. Hydrogen gas is then continuously circulated through the reactor at incrementally increasing inlet temperatures commencing at about 300° F. and increasing to 800° F. over a period of about 8 hours. At the end of this period the catalyst is substantially free of wax and in a highly active, sulfided state, substantially equivalent to the activity achieved by the conventional in situ presulfiding of the oxidized form of the catalyst.

Example II

The impregnated and air-calcined catalyst of Example I is immersed in a molten bath of the same paraffin wax containing dissolved and suspended therein about 20 weight-percent of elemental sulfur, and is allowed to digest in the bath at 300° F. for about 2 hours, during which period a considerable quantity of water vapor and hydrogen sulfide is evolved. The resulting catalyst is then drained, cooled to room temperature and packed into shipping drums.

This catalyst is partially sulfided, but still contains some of the active metal components in oxide forms. Sulfiding is completed, and the paraffin wax removed, by the same procedure described in Example I, except that in this case it is desirable to pass the recirculating hydrogen stream through a drying chamber to remove evolved water vapor. The resulting catalyst has substantially the same activity as that of Example I.

Example III

A palladium-promoted hydrogen-magnesium Y zeolite hydro-cracking catalyst is prepared by first ion-exchanging a sodium Y zeolite with an aqueous ammonium chloride solution to replace about 90% of the zeolitic sodium ions with ammonium ions, followed by a partial back-exchange with magnesium sulfate solution to introduce about 3 weight-percent MgO into the zeolite, followed by a final ion exchange with a solution of tetramine palladium chloride solution containing the stoichiometric amount of palladium calculated to provide 0.5 weight-percent thereof in the final catalyst. The final exchange slurry is then filtered and the filter cake washed with distilled water and dried to about 20% water content. The resulting powder is then mixed with 20 weight-percent of an activated alumina binder and pelleted into ⅛-inch pellets. The pellets are then gradually heated to about 900° F. during about 4 hours and held at this temperature for 12 hours to remove water and to decompose zeolitic ammonium ions and leave in their place zeolitic hydrogen ions. Sulfiding of this catalyst is accomplished by passing a stream of hydrogen containing about 10 volume-percent $H_2S$ through the catalyst at atmospheric pressure and 300° F. for a period of about 3 hours. The sulfided catalyst, without substantial cooling, is then immersed for about 10 minutes in a molten bath of paraffin wax at a temperature of about 250° F. The pellets are then drained, cooled to room temperature and packed into shipping drums.

Since the hydrocracking activity of this catalyst is much higher than that of the hydrofining catalyst utilized in Examples I and II, the impregnated wax can be removed at substantially lower temperatures. Removal can be achieved for example by passing a stream of hydrogen at 1000 p.s.i.g. through the catalyst bed at temperatures gradually increasing from about 200° F. to 600° F. over a period of 2–4 hours. In this case it is desirable to include about 10 volume-percent of hydrogen sulfide in the hydrogen stream in order to prevent reduction of the palladium sulfide back to metallic palladium.

Example IV

The calcined and sulfided zeolite catalyst of Example III is cooled to a temperature of about 50° F. evacuated at 10 mm. Hg, and then immersed for about 2 seconds in a molten bath of a 200° F. melting point polyethylene, the bath temperature being about 300° F. This technique produces a film of polyethylene on the exterior surfaces of the catalyst pellets which does not penetrate significantly into the interior thereof. The resulting coated pellets can be shipped safely in commerce, and after loading into the ultimate reactor the polyethylene film can be removed in about 2–4 hours by hydrocracking in a stream of 90% hydrogen–10% $H_2S$ at 1000 p.s.i.g. and 600° F. The resulting catalyst is equivalent in activity to one prepared by sulfiding the calcined catalyst in the reactor over a more extended period of time.

Various modifications of this invention will be apparent from the foregoing description and further modifications will be obvious to those skilled in the art. Such modifications and changes are intended to be included within the scope of the invention as defined by the following claims:

I claim:

1. A composition of matter comprising (1) an agglomerate of a finely-divided sulfide and oxide of a catalytic metal selected from the class consisting of the Group I–B, II–B, V–B, VI–B, VII–B, and VIII metals, (2) a substantially inert, solid, gas-impermeable organic sealant coating at least the exterior surface area of said agglomerate, said sealant having a melting point between about 100° and 400° F., and being vaporizable or hydrocrackable from said agglomerate at temperatures in the range of about 300°–800° F., and (3) containing an amount of sulfur or decomposable sulfur compound dispersed or dissolved in said sealant, stoichiometrically sufficient to effect substantial sulfiding of said oxide form.

2. A composition as defined in claim 1 wherein said agglomerate is a pellet composed of a major proportion of an adsorbent, difficultly-reducible mineral oxide carrier, and a minor proportion of said catalytic metal deposited thereon by impregnation or ion exchange.

3. A composition of matter comprising (1) a pelleted composite of a major proportion of an adsorbent, difficultly reducible mineral oxide carrier and a minor proportion of at least one sulfided and oxidized catalytic metal deposited thereon by impregnation or ion exchange, and selected from the class consisting of the Group I–B, II–B, V–B, VI–B, VII–B and VIII metals, and (2) a substantially inert, solid, gas-impermeable organic sealant coating at least the exterior surface areas of said pelleted composite, said sealant having a melting point between about 100° and 400° F., being vaporizable or hydrocrackable from said pelleted composite at temperatures in the range of about 300°–800° F. and containing sulfur or a decomposable sulfur compound in an amount sufficient to effect sufficient sulfiding of the oxidized catalytic metal.

4. A composition as defined in claim 3 wherein said sealant is paraffin wax.

5. A composition as defined in claim 3 wherein said carrier is essentially activated alumina, and said catalytic metal is selected from the group consisting of the Group VI–B and Iron-Group metals and mixtures thereof.

6. A composition as defined in claim 3 wherein said carrier is essentially a crystalline alumino-silicate zeolite cracking base, and said catalytic metal is selected from the group consisting of the Group VI–B and Group VIII metals and mixtures thereof.

7. A composition of matter comprising (1) a pelleted composite of a major proportion of an adsorbent, difficultly reducible mineral oxide carrier and a minor proportion of at least one oxide of a catalytic metal deposited thereon by impregnation or ion exchange, and selected from the class consisting of the Group I–B, II–B, V–B, VI–B, VII–B and VIII metals, (2) a substantially inert, solid, gas-impermeable organic sealant coating at least the exterior surface areas of said pelleted composite, said sealant having a melting point between about 100° and 400° F. and being vaporizable or hydrocrackable from said pelleted composite at temperatures in the range of about 300°–800° F., and (3) an amount of sulfur or decomposable sulfur compound combined with said sealant stoichiometrically sufficient to effect substantial sulfiding of said catalytic metal oxide.

8. A composition as defined in claim 7 wherein said sealant is paraffin wax.

9. A composition as defined in claim 7 wherein said carrier is essentially activated alumina, and said catalytic metal is selected from the group consisting of the Group VI–B and Iron-Group metals and mixtures thereof.

10. A composition as defined in claim 7 wherein said carrier is essentially a crystalline alumino-silicate zeolite cracking base, and said catalytic metal is selected from the group consisting of the Group VI–B and Group VIII metals and mixtures thereof.

11. A method for sulfiding a finely divided oxide of a catalytic metal selected from the class consisting of the Group I–B, II–B, V–B, VI–B, VII–B and VIII metals to produce a highly active sulfided catalyst which comprises subjecting an agglomerate of said metal oxide which has been coated or impregnated with an organic sealant selected from the class consisting of hydrocarbon waxes and aliphatic hydrocarbon polymers and which contains suspended or dissolved therein added sulfur or a hydrodecomposable compound thereof, to heating and stripping in a stream of hydrogen at temperatures in the range of about 300°–800° F. for a sufficient time to remove said sealant and sulfide said metal oxide.

12. A method as defined in claim 11 wherein said agglomerate is a pellet composed of a major proportion of an adsorbent, difficultly-reducible mineral oxide carrier, and a minor proportion of said catalytic metal oxide deposited thereon by impregnation or ion exchange.

13. A method for the manufacture of a pelleted, normally pyrophoric metal sulfide catalyst capable of being safely shipped in commerce while in contact with air, which comprises:
(1) impregnating a pelleted, adsorbent, difficultly- reducible mineral oxide carrier with an aqueous solution of a salt of at least one catalytic metal selected from the class consisting of the Group I–B, II–B, V–B, VI–B, VII–B and VII metals;
(2) drying and calcining the impregnated carrier in air at elevated temperatures sufficient to convert said catalytic metal to an oxide form;
(3) partially sulfiding the resulting calcined catalyst; and
(4) coating or impregnating the sulfided catalyst with a substantially inert, molten, organic sealant having a melting point between about 100° and 400° F., being capable of forming a gas-impermeable film on said catalyst which is vaporizable or hydrocrackable therefrom at temperatures in the range of about 300°–800° F. and containing sulfur or a decomposable sulfur compound sufficient to effect substantial further sulfiding of said oxide form.

14. A method as defined in claim 13 wherein said sealant is parraffin wax.

15. A method as defined in claim 13 wherein said carrier is essentially activated alumina, and said catalytic metal is a metal selected from the group consisting of the Group VI–B and Iron-Group metals and mixtures thereof.

16. A method as defined in claim 13 wherein said carrier is essentially a crystalline alumino-silicate zeolite cracking base, and said catalytic metal is a metal selected from the group consisting of the Group VI–B and Group VIII metals and mixtures thereof.

References Cited

UNITED STATES PATENTS

| | | | |
|---|---|---|---|
| 1,390,683 | 9/1921 | Ellis | 252—430 |
| 2,842,504 | 7/1958 | Jones | 252—430 |
| 3,450,626 | 6/1969 | Wight et al. | 252—439X |
| 3,453,217 | 7/1969 | Kozlowski et al. | 252—439X |

PATRICK P. GARVIN, Primary Examiner

U.S. Cl. X.R.

252—428, 439